US012693121B2

(12) United States Patent
Hoffmann et al.

(10) Patent No.: US 12,693,121 B2
(45) Date of Patent: Jul. 28, 2026

(54) SYSTEM AND METHOD FOR CHECKING THE PLAUSIBILITY OF A VEHICLE ENVIRONMENT HYPOTHESIS FOR A MOTOR VEHICLE

(71) Applicant: CARIAD SE, Wolfsburg (DE)

(72) Inventors: Oliver Hoffmann, Wolfsburg (DE); Frank Dierkes, Wolfsburg (DE)

(73) Assignee: CARIAD SE, Wolfsburg (DE)

( * ) Notice: Subject to any disclaimer, the term of this patent is extended or adjusted under 35 U.S.C. 154(b) by 13 days.

(21) Appl. No.: 18/705,409

(22) PCT Filed: Oct. 19, 2022

(86) PCT No.: PCT/EP2022/079055
§ 371 (c)(1),
(2) Date: Apr. 26, 2024

(87) PCT Pub. No.: WO2023/072698
PCT Pub. Date: May 4, 2023

(65) Prior Publication Data
US 2025/0231032 A1      Jul. 17, 2025

(30) Foreign Application Priority Data

Oct. 28, 2021    (DE) .......................... 102021128116.4

(51) Int. Cl.
*G01C 21/30*        (2006.01)
*G06V 10/82*        (2022.01)
*G06V 20/56*        (2022.01)

(52) U.S. Cl.
CPC ............. *G01C 21/30* (2013.01); *G06V 10/82* (2022.01); *G06V 20/588* (2022.01)

(58) Field of Classification Search
CPC ........ G01C 21/30; G01C 21/26; G06V 10/82; G06V 20/588
See application file for complete search history.

(56) References Cited

U.S. PATENT DOCUMENTS 8,666,591 B2    3/2014  Stählin et al.
9,310,210 B2    4/2016  Stählin et al.
(Continued)

FOREIGN PATENT DOCUMENTS

DE      10-2008-053531 A1    5/2009
DE      10-2009-008959 A1    9/2009
(Continued)

OTHER PUBLICATIONS

Geissler et al., "A Plausibility-Based Fault Detection Method for High-Level Fusion Perception Systems," *IEEE Open Journal of Intelligent Transportation Systems* 1:176-186, Sep. 28, 2020. (11 pages).

*Primary Examiner* — Phutthiwat Wongwian
(74) *Attorney, Agent, or Firm* — Seed Intellectual Property Law Group LLP

(57)                ABSTRACT
The disclosure relates to a method and a system for checking plausibility of a vehicle environment hypothesis for a motor vehicle. The method includes providing the vehicle environment hypothesis, which is identified from predefined data and provides an assumption about a characteristic of surroundings of the motor vehicle, detecting environmental features in the surroundings of the motor vehicle by way of a sensor system including a plurality of sensors; evaluating the environmental features with respect to the plausibility of the vehicle environment hypothesis by way of checking each environmental feature of the environmental features for a presence of one or more plausibility criteria, the one or more plausibility criteria depending on a type of the environmental feature and a type of sensor with which the environmental feature was detected; and checking the plausibility of the vehicle environment hypothesis based on the evaluating of the environmental features.

10 Claims, 2 Drawing Sheets

(56)          References Cited

U.S. PATENT DOCUMENTS

| | | | |
|---|---|---|---|
| 10,773,719 | B2 | 9/2020 | Heidenreich et al. |
| 10,962,375 | B2 | 3/2021 | Hasberg et al. |
| 2008/0174451 | A1* | 7/2008 | Harrington ............ G08B 21/06 |
| | | | 340/905 |
| 2022/0043124 | A1* | 2/2022 | Millischer ............. G01S 7/4816 |
| 2022/0234587 | A1* | 7/2022 | Münning ......... G08G 1/096791 |

FOREIGN PATENT DOCUMENTS

| | | | |
|---|---|---|---|
| DE | 10-2009-060600 | A1 | 6/2011 |
| DE | 10-2014-008849 | A1 | 11/2014 |
| DE | 10-2015-214338 | A1 | 2/2017 |
| DE | 10-2015-220695 | A1 | 4/2017 |
| DE | 10-2016-215314 | A1 | 2/2018 |

* cited by examiner

S10

S12

S14

S16

SYSTEM AND METHOD FOR CHECKING THE PLAUSIBILITY OF A VEHICLE ENVIRONMENT HYPOTHESIS FOR A MOTOR VEHICLE

BACKGROUND

Technical Field

The disclosure relates to a method for checking the plausibility of a vehicle environment hypothesis for a motor vehicle, a system for checking the plausibility of the vehicle environment hypothesis, and a motor vehicle with such a system.

Description of the Related Art

In automated vehicles with SAE Level 3 or higher, the driver temporarily hands over the responsibility to the vehicle, and thus the liability to a vehicle manufacturer. As a result, high safety requirements are imposed on the entire system because of the Automotive Safety Integrity Level (ASIL) classification. Current driver assistance systems according to SAE Level 2 generally do not meet these high requirements. New driver assistance systems use mostly predefined data in order to increase a projection with respect to information about a vehicle environment or a characteristic of surroundings of the vehicle, since the installed environment sensor system has a limited field of vision. For example, data from a digital map can be transmitted from a backend to the vehicle, which can be used for vehicle control.

Disadvantageously, due to the fact that there is no assurance that data is up-to-date and due to possible transmission errors, the safety requirements resulting from ASIL classification of the automated driving system, can barely be met. This means that this data or its use in the safety-critical driving function can lead to a violation of a safety objective. If, for example, lane hypotheses that are stored in an outdated digital map would be used for transverse guidance of the vehicle, this could lead to a dangerous situation and thus to the violation of a safety objective.

DE 10 2009 060 600 A1 discloses a method for assigning lanes of a roadway to a motor vehicle, wherein the motor vehicle has a navigation system including a digital map for determining the current position and an image processing device for determining environmental data. The method comprises determining the position of the motor vehicle, identifying the number of lanes of the roadway and extracting marking features of the lanes from the position of the motor vehicle and the digital map, extracting lane markings and their marking features from the environmental data of the image processing device, and comparing the marking features extracted from the digital map and marking features determined by image processing with a classifier to identify the lane of the motor vehicle with respect to the current position.

DE 10 2015 214 338 A1 discloses a method for determining arrangement information for a vehicle. The arrangement information comprises a position of the vehicle and an orientation of the vehicle with reference to a stationary coordinate system. The method comprises detecting a local lane arrangement in surroundings of the vehicle with sensors of the vehicle; determining a first lane arrangement with reference to the stationary coordinate system depending on the local lane arrangement and previously determined arrangement information for the vehicle; determining a second lane arrangement with reference to the stationary coordinate system depending on predefined map material; determining similarity information depending on a geometric similarity between the first lane arrangement and the second lane arrangement; and updating a previously determined arrangement information for the vehicle and a previously determined lane arrangement hypothesis depending on the similarity information.

DE 10 2016 215 314 A1 discloses a driver assistance system, a way of transport, and a method for predicting a traffic situation. The method comprises the steps of identifying a current depiction of surroundings of a vehicle, identifying a future state of an environmental object contained in the depiction using a parametric model, identifying a correction value by way of a machine-based learning method, identifying an uncertainty value by way of the machine-based learning method, identifying a tolerance band for future states by way of the correction value and the uncertainty value for predicting the surroundings of the vehicle.

BRIEF SUMMARY

Embodiments of the disclosure enable evaluation of a vehicle environment hypothesis of a motor vehicle.

The disclosure is based on the idea that a vehicle environment hypothesis, for example a lane hypothesis, is evaluated with environmental features which are detected by multiple sensors, to ascertain if predefined data from which the vehicle environment hypothesis is obtained, meets safety requirements. Thus, if the vehicle environment hypothesis is confirmed, the data can be used for vehicle control, in particular autonomous motor vehicle control.

The disclosure provides a method for checking the plausibility of a vehicle environment hypothesis for a motor vehicle. The method which can be carried out, for example, by a system with a sensor system and a computing device comprises: providing the vehicle environment hypothesis, which is identified from predefined data and provides an assumption about a characteristic of surroundings of the motor vehicle, detecting environmental features in surroundings of the motor vehicle by way of a sensor system, the sensor system having a plurality of different sensors, evaluating the detected environmental features with respect to plausibility of the vehicle environment hypothesis by way of checking the respective detected environmental feature for the presence of one or more predefined plausibility criteria, the plausibility criteria depending on a type of the environmental feature and a type of sensor with which the environmental feature was detected, and checking plausibility of the vehicle environment hypothesis based on the evaluated environmental features.

In other words, first, a vehicle environment hypothesis can be identified from predefined data, wherein the vehicle environment hypothesis represents an assumption about a characteristic of surroundings of the motor vehicle. For example, the predefined data can originate from a digital high-resolution map, and the vehicle environment hypothesis, which is identified from such data, can comprise, for example, an assumption about a number of existing lanes and/or the accurate geometric course of lanes and/or a lane width at a current or future position. This means that in this example the characteristic of surroundings of the motor vehicle is the number of lanes which can be provided from the predefined data.

In order to check whether this vehicle environment hypothesis corresponds to reality or whether, for example, the predefined data is out of date, next, a sensor system can record an environment of the motor vehicle, wherein, in said recording the environment, environmental features are identified, based on which said vehicle environment hypothesis can be confirmed or refuted. For this purpose, the sensor system has at least two sensors, with one type of sensor of the at least two sensors being different. Preferably, at least three different types of sensors can be provided, in particular a camera, a radar, a lidar. Alternatively or additionally, the sensor system can also have an ultrasonic sensor. The sensors of the sensor system can detect the same or different environmental features which particularly depends on the type of environmental feature and a field of vision of the respective sensor. Environmental features can include, for example, traffic signs, lane markings, peripheral buildings, especially guard rails, beacons, walls and or curbs, object routes/convoy routes and or objects, in particular other vehicles.

After identifying the environmental features, each environmental feature can be checked whether it confirms the vehicle environment hypothesis or not. For this purpose, the respective environmental features can be checked whether one or more predefined plausibility criteria are present for the respective environmental feature or not. The plausibility criteria can predefined differently for each environmental feature, wherein the plausibility criteria can be predefined from a simulation, for example. Alternatively or additionally, the plausibility criteria for the respective environmental features can also depend on the type of sensor used to measure the environmental feature. For example, compared to a measurement by lidar, other plausibility criteria may be checked in case of an environmental feature that was measured by a camera. Preferably, it can also be identified, if the respective environmental feature could even be measured by the respective sensor or whether it was outside of a field of vision.

Furthermore, when making the evaluation, the plausibility criteria can be weighted differently depending on the type of environmental feature and/or depending on the type of sensor, so that if predefined plausibility criteria are met, the vehicle environment hypothesis is more likely to be correct. Preferably, a confidence value can be identified for every plausibility criterion that is met, which confidence values can in particular be weighted differently in order to weight the respective environmental feature with respect to the vehicle environment hypothesis. The confidence values can indicate the probability of the vehicle environment hypothesis being correct. Preferably, the plausibility criteria can be different depending on the vehicle environment hypothesis. For example, in a lane hypothesis, lane markings, object routes and/or convoy routes can be checked, and in the case of a hypothesis for a speed limit, for example traffic signs and/or objects, in particular a measured speed of the objects, and/or lane markings, wherein, in particular, a color of the lane markings can indicate a reduced speed limit. For example, a yellow lane marking can indicate a construction site and therefore a reduced speed.

The evaluation of the environmental features can be carried out by a computing device, which checks the presence of the respective plausibility criteria in the recordings of the environmental features using artificial intelligence, which has been trained in particular by machine learning.

Finally, the vehicle environment hypothesis can be checked for plausibility based on the evaluated environmental features. That is, the vehicle environment hypothesis can be confirmed or rejected, wherein, upon confirmation, the predefined data from which the vehicle environment hypothesis has been provided, can be marked as valid or up-to-date. The predefined data can then be used, for example, for vehicle control, preferably for autonomous vehicle control. Alternatively, the vehicle environment hypothesis can also be rejected, thereby marking the predefined data as not up-to-date, which makes them therefore not suitable for vehicle control.

For checking plausibility, the evaluations of the environmental features can be stored, for example, in an evaluation table, in which it can be stated which plausibility criterion is confirmed or rejected by which sensor, wherein the evaluation table may preferably also indicate whether an environmental feature could not be measured by a sensor at all, because the environmental feature which could confirm the vehicle environment hypothesis is outside the field of vision. In other words, the vehicle environment hypothesis to be checked or a part of the hypothesis, for example a lane, can be outside the field of vision for an environmental feature. Thus, the environmental feature cannot be used to check plausibility in this area since it cannot be measured. Preferably, a different field of vision can be defined for each environmental feature, since they may be detected differently by the sensors. In particular, confidence values identified in each case can be stored in the evaluation table by way of which a statistical evaluation can be carried out regarding the validity of the vehicle environment hypothesis. For this purpose, statistical methods can be used that calculate a statement about the credibility of the vehicle environment hypothesis. In particular, the vehicle environment hypothesis can be checked by way of a Dempster-Shafer theory.

The predefined data from which the vehicle environment hypothesis is established can originate from different data sources, in particular not corresponding to the safety requirements of an ASIL classification, such as, for example, data from a digital map, swarm data and/or data from artificial intelligence, wherein the data can be upgraded by way of the method and a confirmed vehicle environment hypothesis in such a way that it corresponds to the ASIL classification. Advantageously, the predefined data can now be used for vehicle control without jeopardizing the safety objectives of the vehicle. In particular, the sensor system can be used to check the plausibility of the data/vehicle environment hypothesis during runtime in the motor vehicle. The evaluation is not done using a single sensor principle and a single environmental feature, but rather using a combination of several types of sensors and environmental features. This creates redundancy in the evaluation, which increases its reliability. Preferably, the data can be used for controlling the motor vehicle, whereby safety-relevant driving functions can be carried out, which increases comfort for a user and thus acceptance.

The disclosure includes also embodiments resulting in additional benefits.

One embodiment provides that the predefined data from which the vehicle environment hypothesis is identified, is a digital map and/or swarm data and/or data from artificial intelligence, in particular a neural network. In other words, the predefined data can originate from a non-ASIL-compliant source and, using the method, can be upgraded to ASIL-compliant data. For example, a digital map can contain road information, such as a number of lanes, a course of the road and/or speed information for route sections. Swarm data can be aggregated from multiple vehicles in a vehicle fleet, from which characteristics of surroundings of the motor vehicle can be identified. Artificial intelligence, especially a neural network, can be trained by machine learning, to carry out vehicle functions, for example. Advantageously, this embodiment enables checking vehicle environment hypotheses from multiple sources.

A further embodiment provides that, when checking the respective detected environmental feature for the presence of the at least one plausibility criterion, a current field of vision of the respective sensors is taken into account. In other words, it can be taken into account whether a respective sensor can perceive an environmental feature or not. For example, an environmental feature can only be recognized by a single sensor based on a field of vision of the sensors, with other sensors not even being able to perceive the environmental feature due to the field of vision. The fields of vision of the respective sensors can preferably be predefined and/or estimated. The field of vision of the sensor system can be divided into areas in which the contributing sensors differ. This can be taken into account when checking the plausibility criteria and evaluating the vehicle environment hypothesis, if, for example, in a case where an environmental feature is not confirmed by a sensor or type of sensor, the environmental feature was actually not recognized by the sensor, or the environmental feature cannot be confirmed because it is outside of a current field of vision of the sensor. This can in turn be taken into account in the resulting checking of plausibility of the vehicle environment hypothesis. Advantageously, this embodiment enables the evaluation of the vehicle environment hypothesis to be improved.

Preferably, it is provided, that an installation position of the respective sensor and/or a specification of the respective sensor, in particular an opening angle and/or a measuring range, are taken into account for the current field of vision. An installation position on the motor vehicle can specify a direction that the sensor can detect. Alternatively or additionally, specifications of the respective sensor, for example a resolution, an opening angle or measuring range and/or a measuring range for the respective sensor can be taken into account also.

In a further advantageous embodiment it is provided that current limitations of the fields of vision of respective sensors are determined by way of a sensor data fusion, the current limitations of the fields of vision being taken into account when checking the respective detected environmental feature for the presence of the at least one plausibility criterion. In other words the field of vision of the respective sensor can also depend on whether the sensor can detect an environmental feature unhindered or whether there is an object in the field of vision of the sensor that obscures the environmental feature. In this way, the fields of vision of all sensors can be identified from a sensor data fusion, in particular areas of overlap, wherein, for example, an environmental feature can be measured by one sensor and not by another sensor because there is an object, in particular a vehicle, in the field of vision of the sensor. As a result, in particular, only the plausibility criteria for the sensors can be checked that were able to detect the environmental feature, and for the sensor with the obscured field of vision can be stated, for example, that said environmental feature could not be recognized by this sensor and thus the measurements of this sensor are not taken into account in the evaluation of the environmental feature with respect to the plausibility of the vehicle environment hypothesis.

Another embodiment provides, that the vehicle environment hypothesis is assumed to be plausible, if at least two of the detected environmental features confirm the vehicle environment hypothesis with predefined confidence. In other words, a single environmental feature is not sufficient to confirm the vehicle environment hypothesis, even if said feature confirms the vehicle environment hypothesis. This means that it can be specified in particular, that the vehicle environment hypothesis must confirmed by at least two environmental features, for which the plausibility criteria are met, wherein preferably the plausibility criteria are confirmed by two different sensors and/or types of sensors. This embodiment can be used to improve the checking of the plausibility of the vehicle environment hypothesis, since the probability of a false positive evaluation can be minimized. Thus, safety can be increased even when applying the predefined data for a vehicle control.

Another embodiment provides, that the at least one plausibility criterion to be checked for the respective environmental feature is predefined by way of a simulation. In other words, it is predefined by the simulation, which plausibility criteria are checked for a respective environmental feature, wherein preferably also the type of sensor is taken into account with which the environmental feature was recorded. For the simulation ground truth data from the vehicle environment hypothesis can preferably be used, which serves as an input hypothesis, and can be changed using error injection or fault injection in order to determine effects of the sensors on the evaluation. For example, ground truth data of the vehicle environment hypothesis can be formed using highly accurate digital maps or labeled data around as a reference. In addition, the environmental features to be evaluated can be manipulated using error injection and then evaluated with respect to safety criticality using the ground truth data. By checking the states of the evaluation for safety-critical initial hypotheses the criteria can thus be identified which lead to safe initial hypotheses. These parameters or criteria can be identified statistically through various error cases and simulations. Advantageously, evaluation criteria or plausibility criteria can be identified, which should be available for the respective environmental feature in order to be considered sufficiently safe. This embodiment can increase reliability and confidence for various states.

Preferably, it is provided, that the sensor system has a vehicle camera, a radar and a lidar. This means that the sensor system has at least the three sensors mentioned in order to detect the environmental features, preferably each detected environmental feature being evaluated depending on the respective type of sensor.

Another aspect of the disclosure relates to a system for checking the plausibility of a vehicle environment hypothesis, comprising a sensor system with a plurality of different sensors which are designed to detect environmental features, and comprising a computing device which is designed to evaluate the detected environmental features with respect to a plausibility of the vehicle environment hypothesis by way of checking the respective detected environmental feature for the presence of one or more predefined plausibility criteria, the plausibility criteria depending on a type of the environmental feature and a type of sensor, with which the environmental feature was detected, and to check plausibility of the vehicle environment hypothesis based on the evaluated environmental features. In other words, the system is designed to carry out a method according to any one of the previous embodiments. Same advantages and possible variations are obtained here as those obtained in the method.

According to the disclosure, a motor vehicle with such a system is also provided. The motor vehicle according to the disclosure is preferably configured as a car, in particular as passenger cars or truck, or as a passenger bus or a motorcycle. In particular, the motor vehicle can be designed as an autonomous or semi-autonomous vehicle.

The disclosure also includes the control device for the motor vehicle. The control device can have a data processing device or a processor which is set up to carry out an embodiment of the method according to the disclosure. For this purpose, the processor can have at least one microprocessor and/or at least one microcontroller and/or at least one FPGA (Field Programmable Gate Array) and or at least a DSP (Digital signal Processor). Furthermore, the processor can have program code, which is set up, when executed by the processor, to carry out the embodiment of the method according to the disclosure. Said program code can be stored in a data memory of the processor.

The disclosure also includes refinements of the system according to the disclosure, which have features such as those already described in connection with refinements of the method according to the disclosure. For this reason, the corresponding refinements of the system according to the disclosure are not described again here once more.

The disclosure also comprises the combinations of the features described embodiments. The disclosure comprises also implementations each having a combination of the features of several of the described embodiments, unless the embodiments have been described as mutually exclusive.

BRIEF DESCRIPTION OF THE SEVERAL VIEWS OF THE DRAWINGS

Exemplary embodiments of the disclosure are described below. In the figures.

DETAILED DESCRIPTION

Figures 1, 2:
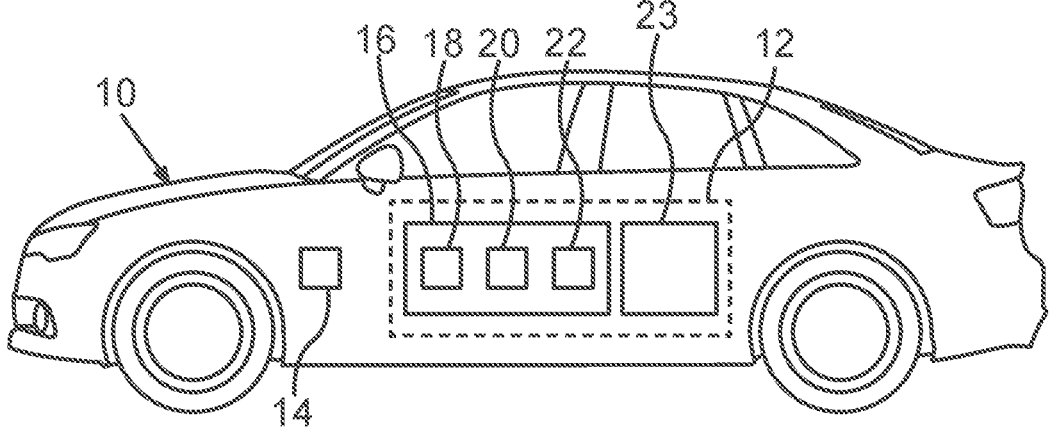
FIG. 1 shows a schematically represented motor vehicle with a system for checking the plausibility of a vehicle environment hypothesis according to an exemplary embodiment.
FIG. 2 shows a schematic method diagram according to an exemplary embodiment.

The exemplary embodiments explained below are advantageous embodiments of the disclosure. In the exemplary embodiments the described components of the embodiments represent in each case individual features of the disclosure to be considered independently from one another, and which refine the disclosure in each case also independently of one another. Therefore, the disclosure is intended to comprise combinations of the features of the embodiments other than those shown. Furthermore, the described embodiments can also be supplemented by other of the already described features of the disclosure.

In the figures, same reference numerals denote functionally identical elements in each case.

FIG. 1 shows a schematically represented motor vehicle 10 with a system 12 for checking the plausibility of a vehicle environment hypothesis according to an exemplary embodiment. Motor vehicle 10 can preferably be an autonomous vehicle that is designed to drive autonomously using predefined data. The predefined data can be, for example, a high-resolution digital map that is received via a navigation system 14 of motor vehicle 10. Since it cannot be ensured that the digital map is up-to-date, system 12 may be designed to check the plausibility of a vehicle environment hypothesis established from the digital map. For example, a lane hypothesis can be established as the vehicle environment hypothesis.

To check the plausibility of the lane hypothesis, system 12 can have a sensor system 16 comprising a vehicle camera 18, a radar 20 and a lidar 22. Furthermore, system 12 can have a computing device 23 that can analyze the sensor measured values, in particular by way of artificial intelligence. System 12 is preferably designed to carry out the method steps shown in FIG. 2 in order to check the plausibility of the vehicle environment hypothesis.

In a step S10, the data from the digital map is used, for example to establish a lane hypothesis. The lane hypothesis can be used, for example, for transverse guidance of a highly automated driving system. As an alternative or in addition to the digital card, for example, swarm data and/or data from artificial intelligence, in particular machine-learned data of a neural network can be used as input data to establish a vehicle environment hypothesis. As an alternative to the lane hypothesis, further hypotheses can also be established, for example about traffic signs, traffic rules, in particular speed limits, overtaking bans and/or right of way rules, or breakpoints.

In a step S12, environmental features of motor vehicle 10 can be detected by camera 18, radar 20 and lidar 22 of sensor system 16, the respective sensor data being merged preferably in sensor data fusion. The various environmental features can be measured by the different sensors. The environmental features can comprise, for example, traffic signs, lane markings, peripheral buildings and object routes.

In a step S14, the measured environmental features can then be evaluated with respect to the plausibility of the lane hypothesis. In doing so, the environmental features can have a different meaning for the evaluation of the safety or plausibility of the lane hypothesis. For example, the various environmental features can have various plausibility criteria in terms of relevance with respect to the lane hypothesis, such as for a direct evaluation of the safety of the hypothesis, in particular intersections with peripheral buildings, an indirect evaluation of the safety of the hypothesis, for example an accordance with perceived lane markings and/or an evaluation of the plausibility of the hypothesis, for example a distance to traffic signs at the side of the road. Depending on the relevance or meaningfulness of the evaluated plausibility criterion, this can be included in the evaluation of the plausibility check of the lane hypothesis with different weighting.

For example, several confidence values can be identified that provide a statement about the plausibility of the lane hypothesis, with one confidence value being identified for each environmental feature and which can also dependent on the sensor type of sensor system 16 which was used to measure the environmental feature. This means that for each environmental feature it can also be specified which sensor confirmed the environmental feature or measured the environmental feature. In doing so, an evaluation table can be created, which shows which sensors and which environmental features confirm the lane hypothesis, which allows a statement to be made about the quality and plausibility of the hypothesis.

For example, traffic signs can serve as environmental features for the evaluation of the lane hypothesis, wherein it can be checked whether a number of lanes matches the number of lanes on the traffic sign, it can be checked whether a number of lanes matches the corresponding number of variable message signs on a sign gantry, it can be checked, if the existence of a lane matches a traffic sign that depicts an end of a lane, it can be checked whether the existence of a narrowing of the road matches a traffic sign that depicts the end of a lane, it can be checked whether the existence of a curve matches a traffic sign that depicts a curve, it can be checked whether recognized traffic signs are positioned outside the lane hypotheses, it can be checked whether existing exits are confirmed by traffic signs, and/or it can be checked whether roundabouts are confirmed by traffic signs. Furthermore, as environmental feature, a lane marking can be checked to see whether a number of lanes matches a corresponding number of perceived lane markings; it can be checked whether the line type of the lane hypotheses matches the line types of the perceived lane markings, a course of lane markings can be checked and/or it can be checked whether intersections with lane markings are recognized. Furthermore, peripheral buildings, in particular intersections with peripheral buildings, such as concrete walls, beacon courses, guardrails or curbs can be detected as environmental features, and/or object routes/convoy routes can be checked as environmental features to see if the object routes are parallel to the lanes, a distance of the object routes to a middle of the lane and to the boundaries and/or an intersection of object routes with lane boundaries can be checked.

Figure 3:
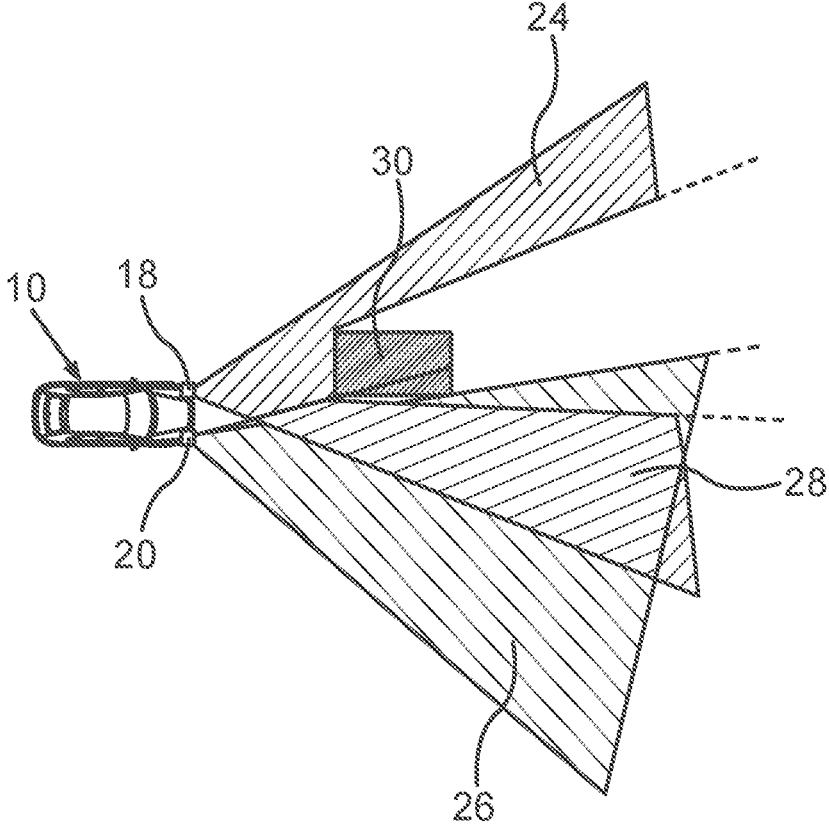
FIG. 3 shows a schematic representation of fields of vision of sensors.

Furthermore, when evaluating the individual environmental features, a field of vision of sensors 18, 20, 22 of sensor system 16 can be taken into account. The fields of vision of the sensors are shown in FIG. 3, for example, wherein FIG. 3 shows a schematic top view of motor vehicle 10. In this exemplary embodiment, motor vehicle 10 can have two sensors, for example camera 18 and radar 20. First of all, the field of vision of camera 18 and radar 20 is determined by an installation position in motor vehicle 10 and a specification of the respective sensor, which means that an opening angle and/or a measuring range are predefined by the specification. For example, camera 18 can have a field of vision 24 in which environmental features can be recognized and radar 20 can have a field of vision 26. Also, camera 18 and radar 20 can have an overlap area 28 in which both sensors can recognize environmental features. Thus, for example, environmental features that only occur in field of vision 24 cannot be measured by radar 20 or vice versa, and environmental features that are found in overlap area 28 can be detected by both sensors.

Additionally, it can be taken into account, if the fields of visions are limited, for example by an object 30 which may be another vehicle in the surroundings. Environmental features located behind object 30 cannot be detected by any of the sensors. This can be taken into account when evaluating the lane hypothesis, for example if environmental features that confirm or refute the lane hypotheses, are even within the field of vision of the respective sensor. Consequently, it can be differentiated, if, in case of a plausibility criterion that has not been confirmed, the environmental feature refutes the vehicle environment hypothesis, or whether the plausibility criterion could not be confirmed because the environmental feature is outside the current field of vision of the sensor. This can in turn be taken into account in the resulting quality evaluation of the lane hypothesis. A lack of confirmation of the lane hypothesis due to an environmental feature can be treated differently depending on the ability to perceive the environmental feature in the current situation.

Finally, in a step S16, the lane hypothesis can be checked for plausibility based on the evaluated environmental features, in particular by identified confidence values, preferably to confirm the lane hypothesis and to use it for transverse guidance of autonomous motor vehicle 10.

In order to identify evaluation criteria that are considered sufficiently safe, the reliability and confidence of various states can be identified in a previous simulation. In doing so, for example, plausibility criteria for various identified environmental features are simulated. For this purpose, ground truth data of the hypotheses can be formed, for example, from high-precision digital maps or labeled data to establish a reference. In addition, the hypotheses to be evaluated can be manipulated using error injection and then evaluated with respect to safety criticality using the ground truth data. By checking the states of an evaluation table in case of safety-critical initial hypotheses the criteria can thus be identified in the evaluation table which lead to safe initial hypotheses. These parameters or plausibility criteria can be identified statistically through various error cases and simulations.

A further exemplary aspect provides for a plausibility check and evaluation of a priori data or predefined data to be carried out by way of environmental features detected by way of sensors in order to meet safety requirements for motor vehicle 10 and at the same time benefit from the advantages of the a priori data, for example digital map data. Data can be used here from a digital map, in order to establish lane hypotheses and to compare the resulting result then with data from the environmental sensor system of a sensor system 16. For this purpose, various environmental features are used which are detected and merged merely by sensors and meet the safety requirements of motor vehicle 10. For each of these environmental features various criteria can be checked that provide a statement about the plausibility or safety of the hypothesis.

Environmental features are, for example, lane markings, peripheral buildings, especially guard rails, curbs or walls, traffic signs or vehicles including their historical movements (vehicle routes). Criteria or plausibility criteria are defined for each environmental feature and can be used to identify, if the respective environmental feature confirms the lane hypothesis, which was generated using the predefined data, and therefore deems it plausible.

The plausibility criteria to be checked can be chosen so that a violation of a safety objective can be ruled out, wherein said criteria can differ for the different environmental features. In addition, for each environmental feature, it can be specified which sensor confirmed the environmental feature or measured the environmental feature. This allows an evaluation table to be created, which shows, which sensors and which environmental features confirm the lane hypothesis, wherein a statement can be made about the quality and plausibility of the hypothesis.

If enough sensors and environmental features confirm the hypothesis, it can be used for further use in the vehicle control because it can be assumed that no safety objective will be violated. There is essentially an ASIL upgrade of a hypothesis that does not meet the safety requirements by a plausibility check with environmental feature-specific safety criteria (plausibility criteria). A decision as to whether a hypothesis is safe can be done both by hard criteria, which must be met, and by soft criteria, which support the confidence of the hypothesis. This confidence or these criteria can be identified in advance by statistical evaluations with reference data (ground truth).

When evaluating if the defined criteria are met, a current field of vision of the environmental sensors can also be taken into account. Here, a field of vision specific for each environmental feature can be estimated, by being able to detect the environmental feature in the current situation by way of sensors. The field of vision can be divided into areas in which the contributing sensors differ. This means that a current field of vision can be estimated for each environmental feature and for each sensor. Alternatively, instead of creating a new field of vision for each sensor, only a new field of vision can be created when the number of sensors differs. Here, an installation position of the sensor, specifications of the sensor and a limitation of the sensor's field of vision due to obscuration in a current situation, for example by other vehicles or peripheral buildings, can be taken into account.

When evaluating a lane hypothesis in terms of plausibility by way of the comparison with an environmental feature, it can be taken into account whether the hypothesis from the a priori data is actually in the currently estimated field of vision of the environmental feature and the sensor. This makes it possible to distinguish whether, in the absence of confirmation, the environmental feature or a sensor actually does not confirm the hypothesis from the a priori data or cannot confirm it at all because it is outside the current field of vision. This can in turn be taken into account in resulting quality evaluation of the hypothesis. As a result, a lack of confirmation of a hypothesis due to an environmental feature is treated differently depending on the ability to perceive the environmental feature in the current situation.

In addition to lane hypotheses also other hypotheses can be evaluated from a priori data. These can be, for example, traffic signs or stopping points, which can be checked for plausibility by other environmental features. Also hypotheses, generated by machine learning methods, such as, for example, neural networks, can be evaluated in this way. Machine learning methods have the disadvantage, that in general, they also do not meet the high safety requirements of the ASIL classification and therefore cannot be used for safety-relevant functions, such as transverse guidance.

By evaluating the environmental features with multiple sensor principles, redundancy in the evaluation can be achieved, which increases reliability. Furthermore, the ability to evaluate is taken into account based on the perception ability of the sensors and environmental features and thus differentiated, if a hypothesis is not confirmed or cannot be evaluated due to the field of vision of the sensor.

Overall, the examples, demonstrate how an evaluation and plausibility check of vehicle environment hypotheses, in particular lane hypotheses can be provided by way of sensor-based environmental features.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for checking plausibility of a vehicle environment hypothesis for a motor vehicle, comprising:

providing the vehicle environment hypothesis, wherein the vehicle environment hypothesis is identified from predefined data and provides an assumption about a characteristic of surroundings of the motor vehicle;

detecting environmental features in the surroundings of the motor vehicle by way of a sensor system including a plurality of sensors;

evaluating the environmental features with respect to the plausibility of the vehicle environment hypothesis by way of checking each environmental feature of the environmental features for a presence of one or more plausibility criteria, the one or more plausibility criteria depending on a type of the environmental feature and a type of sensor with which the environmental feature was detected; and checking the plausibility of the vehicle environment hypothesis based on the evaluating of the environmental features, wherein, when checking each environmental feature of the environmental features for a presence of the one or more plausibility criteria, a current field of vision of each of the sensors is taken into account, and wherein a current limitation of a field of vision of each of the sensors is determined by way of sensor data fusion, the current limitation of the field of vision of each of the sensors being taken into account when checking each environmental feature of the environmental features for the presence of the one or more plausibility criteria.

2. The method according to claim 1, wherein the predefined data, from which the vehicle environment hypothesis is determined, is a digital map and/or swarm data and or data from artificial intelligence.

3. The method according to claim 1, wherein an installation position and/or a specification of each of the sensors is taken into account for the current field of vision.

4. The method according claim 1, wherein the vehicle environment hypothesis is assumed to be plausible if at least two of the environmental features confirm the vehicle environment hypothesis with a predefined confidence.

5. The method according claim 1, wherein the one or more plausibility criteria to be checked for each of the environmental features is predefined by way of a simulation.

6. The method according to claim 1, wherein the sensor system includes a vehicle camera, a radar and a lidar.

7. The method according to claim 1, wherein the predefined data, from which the vehicle environment hypothesis is determined, is from a neural network.

8. The method according to claim 3, wherein an opening angle and/or a measuring range of each of the sensors is taken into account for the current field of vision.

9. A system for checking plausibility of a vehicle environment hypothesis, comprising:

a sensor system including a plurality of sensors, wherein the sensors, in operation, detect environmental features; and a computing device which, in operation, performs an evaluation of the environmental features with respect to a plausibility of the vehicle environment hypothesis by way of checking each environmental feature of the environmental features for a presence of one or more plausibility criteria, wherein the one or more plausibility criteria depend on a type of the environmental feature and a type of sensor with which the environmental feature was detected, and checking the plausibility of the vehicle environment hypothesis based on the evaluation of the environmental features, wherein when checking each environmental feature of the environmental features for a presence of the one or more plausibility criteria a current field of vision of each of the sensors is taken into account, and wherein a current limitation of a field of vision of each of the sensors is determined by way of sensor data fusion, the current limitation of the field of vision of each of the sensors being taken into account when checking each environmental feature of the environmental features for the presence of the one or more plausibility criteria.

10. A motor vehicle including the system according to claim 9.

* * * * *